Aug. 12, 1924.
E. PIZZOGLIO
1,504,500
COFFEE MACHINE FOR THE PREPARATION OF INSTANTANEOUS COFFEE
Filed Dec. 15, 1922
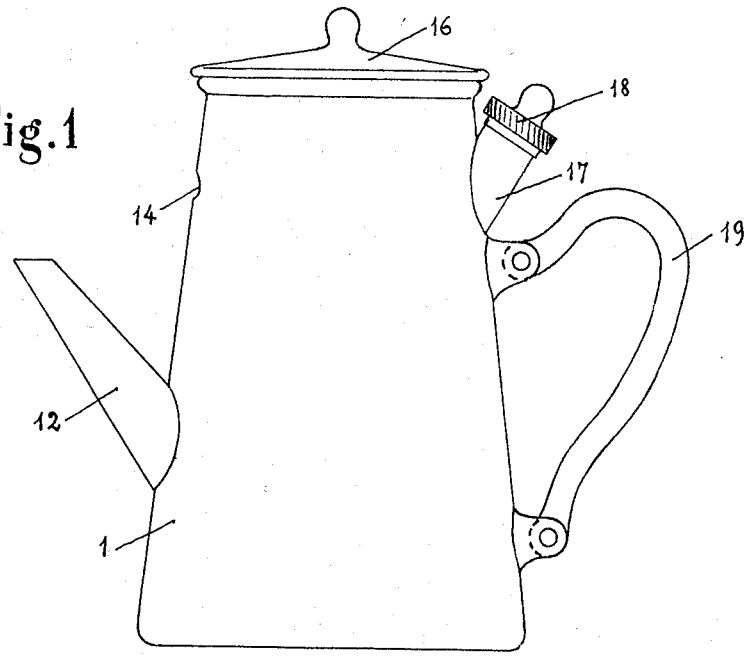
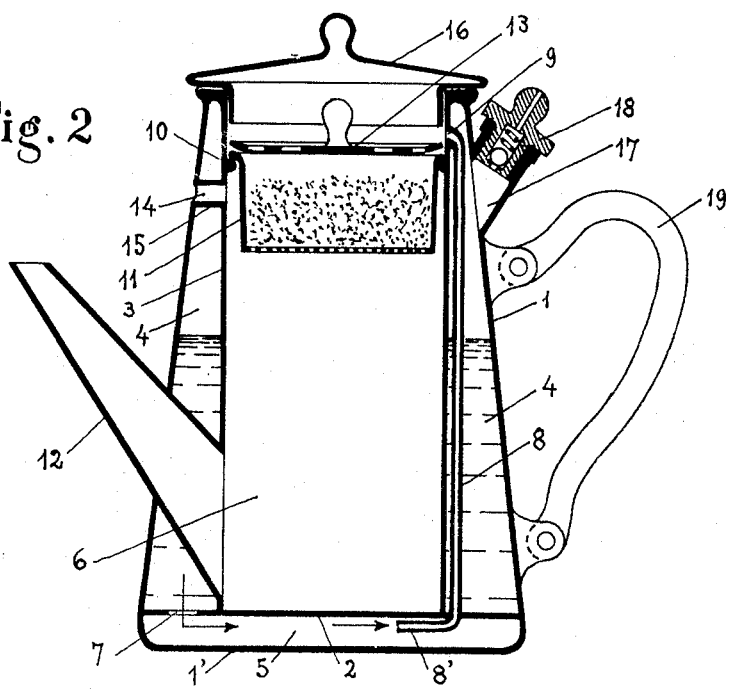
Inventor.
Ettore Pizzoglio
By Henry Orth Jr
Atty.

Patented Aug. 12, 1924.

1,504,500

UNITED STATES PATENT OFFICE.

ETTORE PIZZOGLIO, OF TURIN, ITALY, ASSIGNOR TO CESARE RICHIARDI, OF TURIN, ITALY.

COFFEE MACHINE FOR THE PREPARATION OF INSTANTANEOUS COFFEE.

Application filed December 15, 1922. Serial No. 607,070.

*To all whom it may concern:*

Be it known that I, ETTORE PIZZOGLIO, a subject of the King of Italy, and a resident of Turin, Italy, have invented a new and Improved Coffee Machine for the Preparation of Instantaneous Coffee, of which the following is a full, clear, and exact description.

The invention relates to a new type of machine for the preparation of instantaneous coffee, which, in regard to the manner of its construction and to the manner of working presents important differences from the other known types of similar machines.

The figures of the accompanying drawing illustrate solely by way of example a form of the execution of a coffee-machine constructed according to the invention.

Fig. 1 is a side view of the said coffee-machine, and Fig. 2 is a vertical section made through the middle of the same.

As it may be seen from the said figures, the machine for the preparation of instantaneous coffee constructed according to the invention consists essentially in an outer recipient 1 having nearly the form of the usual coffee-pots, whose interior by means of a horizontal partition or double bottom 2 and a cylindrical recipient 3 conveniently soldered together and with the said outer recipient form three chambers, 4, 5 and 6. Of these chambers, the ones 4 and 5, that is to say the chamber 4 or reservoir of the cold water, and the lower chamber 5 or chamber of ebullition, communicate together through one or more holes 7, while the chamber 4 is also in communication with the inner chamber 6 and precisely with its upper part by means of a little tube 8. This tube 8 commences in the chamber 5 for instance with the horizontal piece 8' forming a right angle and after having passed along the chamber 4 in its height, has its mouth in the point 9 where the end of the little tube 8 is soldered to the upper part of the inner chamber 6.

A little under the mouth 9 of the tube 8 there is fixed to the inner surface of the cylinder 3 by means of soldering or in any other convenable manner a circular border 10 forming projection serving as a supporting ring for the corresponding upper border of the basket 11 of the filter.

Between the filter basket and the mouth of the tube 8 is placed a plate or disk 13 provided with large holes for the purpose of distributing with regularity over the ground coffee on the filter basket 11 the boiling water streaming as a jet from the mouth 9 of the said tube 8.

The inner cylindrical recipient 3 is in communication with the outer air through the hole 14 of a tube 15 which traverses the upper part of the outer chamber 4 but does not communicate with it because it is soldered to the recipient 3 as well as to the outer recipient 1: it has the purpose of giving free issue to the vapours developing from the boiling water streaming from the mouth 9 of the tube 8.

To the lower part of the inner recipient 3 is fixed in convenable manner the base of the spout 12 which serves to pour the coffee, the said spout traversing the lower part of the chamber 4 and being soldered to the outer recipient 1.

The cold water is introduced into the outer recipient 4 through the tube 17 which afterwards is convenably closed for instance by means of a screw-plug 18 of any suitable form.

The top of the inner chamber 6 is closed by means of the cover 16, and for the easy management of the coffee machine the outer chamber is provided with a handle of wood or any other suitable material.

The manner of working of the coffee-machine for the preparation of instantaneous coffee according to the invention, results clearly from the simple sight of the drawing.

In fact, if after having poured inside the outer chamber 4 through the tube 17 a suitable quantity of water, this tube is closed with the screw-plug 18 and the bottom 1' of the recipient 1 is exposed to heat, the small quantity of water contained in the chamber 4 will enter promptly in ebullition, and in consequence of the developed pressure the said water will be compelled to enter continually in the tube 8 and to issue from the mouth 9 of this tube into the upper part of the chamber 6, so that the jet of boiling water will fall on the distributing plate 13 and then on the ground coffee contained inside the filter basket 11, while at the same time a corresponding quantity of water coming from the chamber 4 will flow through the communicating hole 7 between the two chambers 4 and 5, in order to surrogate continually the quantity of boiling water flowing out from the chamber 5 through the tube 8 and its mouth 9 till the complete exhaustion of the disposable quantity of water.

It will be understood that the invention is not limited to the arrangements shown and described, and that any modifications within the range of every expert may be made as required or rendered advantageous by the circumstances or the requirements of practice without departing from the essential nature of this invention.

Having thus described my invention, I claim as new and desire to secure by Letters Patent:

1. A coffee machine comprising an outer receptacle, a receptacle mounted therein forming an annular chamber between the two receptacles, said receptacles being connected at their upper portions to prevent communication between the annular chamber and the inner receptacle, a chamber formed below the inner receptacle, and means for establishing communication between the last named chamber and the upper portion of the inner receptacle.

2. A coffee machine comprising a coffee container, a water chamber surrounding the latter, means for preventing direct communication between the container and chamber, a boiler compartment beneath the container and chamber and communicating with the latter, and a conduit communicating with the boiler and the top portion of the container.

3. A coffee machine of the kind described in the above specification, comprising three chambers respectively for cold water, boiling water and prepared coffee, the chamber of cold water and boiling water being communicating together through one or more holes made through the double bottom, while the chamber of boiling water communicates with the chamber of prepared coffee by means of a small tube whose mouth is situated above the filter basket of the ground coffee, while the outer chamber or chamber of cold water is provided with a filling tube closed with screw-plug combined with safety-valve.

4. In a coffee-machine of the kind described in the above specification, the combination of three chambers respectively for cold water, boiling water, and prepared coffee, the chamber of the prepared coffee being provided with a ring serving to support the filter basket, the said ring being disposed under the mouth of the tube coming from the boiling chamber, so that the jet of the boiling water falls into the said filter basket by interposition of a plate or disk provided with large holes for the regular distribution of the jet of boiling water over the ground coffee, while the prepared coffee is collected inside the inner recipient, which is provided in the upper side with means for the free issue of the vapours developing from the boiling water, and at its bottom with a spout for pouring out the coffee.

In testimony whereof I have signed my name to this specification.

ETTORE PIZZOGLIO.